May 23, 1967                    J. W. TATOM                    3,320,822
                              ROTARY ACTUATOR
                           Filed April 12, 1965
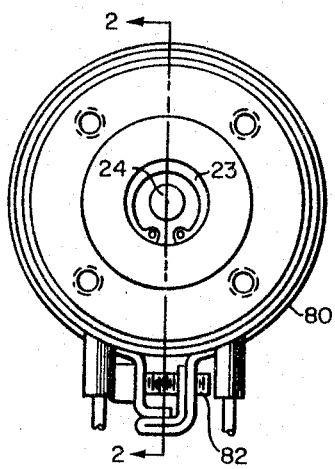
FIG. 1
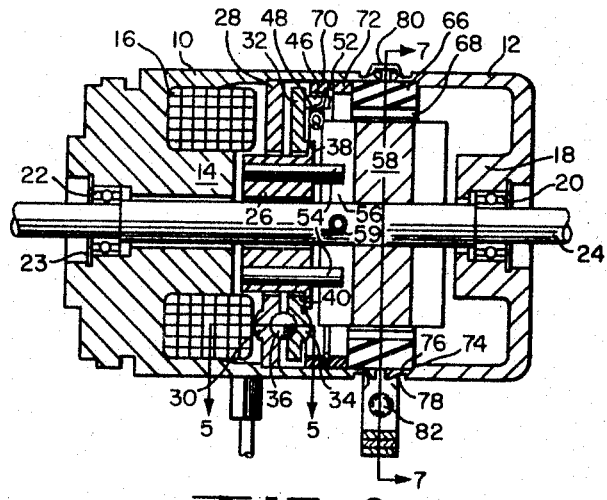
FIG. 2
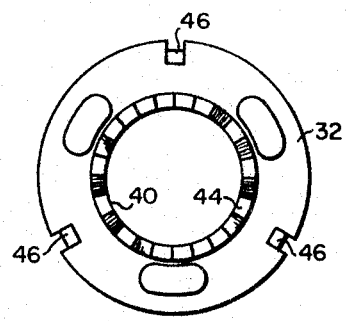
FIG. 3
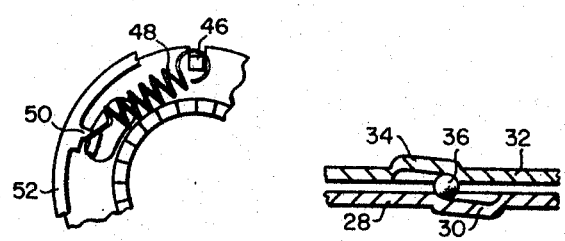
FIG. 4    FIG. 5
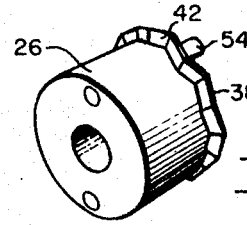
FIG. 6
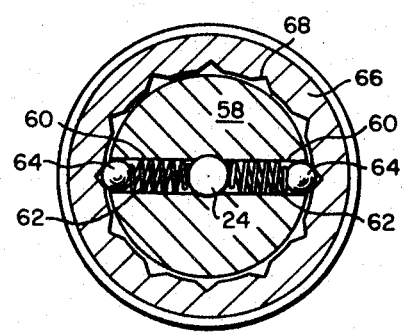
FIG. 7
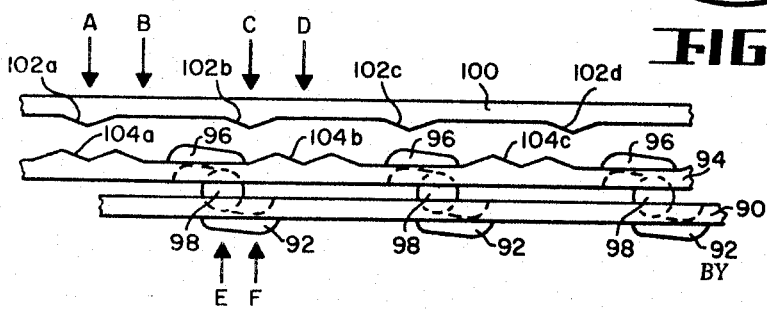
FIG. 8
INVENTOR.
JAMES W. TATOM
BY
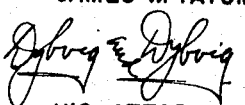
HIS ATTORNEYS

United States Patent Office 3,320,822
Patented May 23, 1967

3,320,822
ROTARY ACTUATOR
James W. Tatom, Brookville, Ohio, assignor to Ledex, Inc., Dayton, Ohio, a corporation of Ohio
Filed Apr. 12, 1965, Ser. No. 447,455
13 Claims. (Cl. 74—126)

This invention relates to a rotary actuator and more particularly to an electromagnetically powered device for imparting a limited rotary movement to a driven shaft, however, the invention is not necessarily so limited.

The present invention is directed to rotary actuators of the type disclosed in United States Letters Patent No. 2,496,880 issued to George H. Leland, Feb. 7, 1950. Such actuators utilize a motion conversion mechanism for converting limited linear motion to limited rotary motion. In such mechanism confronting plates each provided with inclined arcuate ball races receive ball bearing elements therebetween. Upon application of a compressive thrust to move the plates linearly one towards the other, the ball bearings acting in the inclined arcuate recesses generate a torque causing one plate to rotate relative to the other through a limited angle. The compressive thrust means can be electromagnetic, hydraulic or pneumatic devices, as examples.

In the foregoing device the recesses which receive the ball bearing elements limit the rotational movement available to the ball bearing elements and accordingly limit the rotary output stroke. After each operation of the device to produce a rotary output stroke the rotary conversion plates and the ball elements therebetween must be reset in preparation for a second output stroke. The resetting action is accomplished by a counter-rotation of one plate relative to the other and thus the rotary action produced by the foregoing motion conversion mechanism is an over and back oscillating motion comprising a forward power stroke and a reverse stroke to reset the motion conversion mechanism.

Such mechanism has a wide range of applications, such as the operation of single-throw electrical switches and hydraulic valves. However, it will be apparent that the range of applications is significantly extended by associating a clutch mechanism with the rotary output so that the oscillating rotary movement produced by the motion conversion means can be converted to a stepped unidirectional rotary movement in the driven element. Thus, by use of a clutch mechanism which disengages in one direction of said oscillating rotary movement it becomes possible to drive a driven shaft continuously in one direction by step-wise increments.

One type of clutch mechanism frequently used in association with the actuator of the foregoing patent is shown in the patent. The clutch mechanism of the patent comprises confronting ratchet wheels which are brought into engagement during the power stroke and disengaged on the return stroke.

An object of the present invention is to provide an improved clutch mechanism for use in rotary actuators of the type described.

Another object of the present invention is to provide a clutch mechanism having an enhanced reliability.

A further object of the present invention is to provide in a rotary actuator device, a clutch mechanism which is integrated into the working components of the rotary actuator device.

A still further object of the present invention is to provide an improved clutch mechanism for use in rotary actuator devices wherein the clutch mechanism has the capacity to add to, or subtract from, the rotary stroke of the actuator device.

Other objects and advantages reside in the construction of parts, the combination thereof, the method of manufacture and the mode of operation, as will become more apparent from the following description.

In the drawing FIGURE 1 is an end elevation view illustrating the exterior configuration of a device embodying the present invention.

FIGURE 2 is a longitudinal sectional view taken substantially along the line 2—2 of FIGURE 1, portions of a driven shaft having been broken away.

FIGURE 3 is a plan view of a rotary conversion plate employed in the assembly of FIGURE 2.

FIGURE 4 is a fragmentary plan view of an operating mechanism employed in the assembly of FIGURE 2.

FIGURE 5 is a fragmentary sectional view taken substantially along the line 5—5 of FIGURE 2.

FIGURE 6 is a perspective view of an armature employed in the assembly of FIGURE 2.

FIGURE 7 is a sectional view taken substantially along the line 7—7 of FIGURE 2, an encircling clamp device having been removed.

FIGURE 8 is a schematic view illustrating the operation of a first modification.

Referring to the drawings in greater detail, the device of FIGURES 1 through 7 is assembled within a case comprising separable housing parts 10 and 12. The housing part 10 is of ferromagnetic material and includes an interior cylindrical body 14 which serves as the core for an electromagnet. The electromagnet is completed by a coil 16 wound about the core 14.

The housing part 12, which need not be ferromagnetic, has an internal cylindrical boss 18 which is bored to receive a roller bearing 20. A cooperating roller bearing 22 is seated in a complementary bore in the housing part 10. The two bearings 20 and 22 retained by snap rings such as shown at 23 in FIGURE 1 cooperate to journal a shaft 24 for rotation, the shaft 24 passing axially through a suitable oversized aperture in the core 14.

Mounted for both rotary and axial movement on the shaft 24 is an armature 26, also consisting of a ferromagnetic material. The arrangement is such that passage of an electric current through the coil 16 creates a magnetic field attracting the armature 26 to the core 14.

The axial movement of the armature 26 toward the core 14 is used to produce a rotary stroke with the following mechanism. Press fitted in the housing part 10 is a substantially circular plate 28, having a central aperture which receives the armature 26 without interference. As shown, the plate 28 is positioned in covering relation to the coil 16 and is disposed in a plane perpendicular to the axis of the shaft 24. The plate 28 is preferably of ferromagnetic material so as to complete a flux path which extends from the core 14 through the outer wall of the housing part 10 and then to the armature 26 through the annular air gap between the armature and the plate 28.

Distributed at equal angular intervals on that face of the plate 28 which is directed away from the coil 16 are three axially inclined arcuate recesses 30. Confronting the plate 28 is a second plate 32 also having a central aperture which receives the armature 26 without interference. The plate 32 is normally disposed perpendicular to the axis of the shaft 24 but, with the exception of a spring connection to be described later, is essentially floating with respect to the shaft 24.

The plate 32 is also desirably ferromagnetic to provide an additional flux path to the armature 26.

The plate 32 is provided with three arcuate axially inclined recesses 34 which confront the recesses 30 in the plate 28. Interposed between the three pairs of confronting recesses are ball bearing elements 36, the construction being such that axial motion of the plate 32 toward the plate 28 induces a rotation of the plate 32 relative to the plate 28 about the axis of the shaft 24. To this end the arcuate recesses are disposed concentric to the axis of the shaft 24.

An axial thrust is supplied to the plate 32 so as to induce relative rotation between the plates 32 and 28 by means of a flange 38, formed on the end of the armature which is remote from the core 14. The flange 38 engages an annular surface 40 having a plurality of triangular teeth 44 arranged circumferentially about the armature 26, the teeth 44 being elevated from the plate 32. The arrangement of the teeth 44 is best seen in FIGURE 3.

The peripheral flange 38 on the armature 26, as best seen in FIGURE 6, is swaged so as to have complementary triangular teeth 42 arranged circumferentially about the armature 26. The teeth 42 and 44 each have the same angle at the apex thereof and are equally spaced so that the teeth 42 interfit between the teeth 44.

In order for the axial pressure applied by the armature 26 to produce a rotary motion of the plate 32, it is essential that the ball bearing elements 36 be properly set in the axially inclined recesses 30 and 34. More specifically, it is important that the ball bearing elements 36 be in the shallow ends of the confronting recesses, as shown in FIGURE 5. To achieve this condition a rotional bias is applied to the plate 32 with the following assembly.

Struck upwardly from the plate 32, at the perimeter thereof, are three tabs 46 disposed at equal angular intervals around the perimeter of the plate 32. The tabs 46 point away from the plate 28. The tabs 46 each provide an anchor for a spring 48, as best seen in FIGURE 4, there being one spring 48 anchored to each tab 46. The opposite end of each spring 48 is anchored to a hook 50 integral with a split annular ring 52, seated within the outer wall of the housing part 10. By means to be described subsequently, the annular ring 52 is firmly secured against rotation within the housing part 10.

The several springs 48 acting between the hook 50 and the tabs 46 cooperate to bias the plate 32 in the proper rotational direction to set the ball bearing elements 36 in the shallow ends of the recesses 30 and 34. With reference to FIGURE 5 the direction of bias is such as to move the plate 32 to the left as viewed in that figure. The magnitude of bias applied to the plate 32 is determined by adjusting the rotary position of the annular ring 52 in a manner to be described subsequently.

With the ball bearing elements 36 biased to the shallow ends of the recesses 30 and 34, as shown in FIGURE 5, axial pressure applied to the plate 32 by the armature 26 induces a rotary movement of the plate 32 about the axis of the shaft 24 through an angle determined by the circumferential lengths of the recesses 30 and 34. The rotary motion imparted to the plate 32 is transmitted to the armature 26 by the interfitting teeth 42 and 44 of the plate 32 and flange 38, respectively. The rotary movement thus transmitted to the armature 26 is transferred to the shaft 24 by the following assembly.

Two pins 54 are drive fitted into suitable apertures in the armature 26 on diametrically opposite sides of the shaft 24. The pins 54 project rearwardly of the armature 26 and away from the core 14. The pins 54 are received in a radially disposed slot 56 located in a cylindrical disc 58 fastened to the shaft 24 by means of a dowel 59. Thus, rotation of the armature 26 results in application of a torque to the disc 58 by means of the pins 54 and transmittal of the torque to the shaft 24 by means of the dowel 59.

The pins 54 have a loose fit in the slot 56 and, as a result, permit the armature 26 to seek a stable position which is not necessarily coaxial to the shaft 24. This construction is preferred so that the ball bearings 36 are equally loaded. Thus, the sliding fit of the pins 54 in the slot 56 permits the teeth 42 and 44 between the armature 26 and the plate 32 to snugly interfit, while, at the same time, the pressure application is uniformly distributed among the three ball bearing elements 36. The armature 26 has a bore receiving the shaft 24 which is sufficiently large for this purpose.

As will appear more fully in later comments concerning the operation of the present structure, the rotary motion transmitted to the shaft 24 is a stepwise rotary motion in the clockwise or counter-clockwise direction, the direction of rotation being determined by the axial inclination of the recesses 30 and 34. In such type of operation it is desirable to provide a means holding the shaft position at the end of each rotary stroke executed by the shaft. Frequently, such means is associated with the load driven by the shaft 24. In other cases the driven load has no associated holding means and for such cases, it is desirable to include the holding means in the rotary actuator.

The holding means might or might not include an index mechanism. When the holding means includes an index mechanism the output shaft will be advanced to predetermined index positions established by the index mechanism and either will be positively prevented from reaching non-index positions or will be unstable in non-index position. When the holding means does not include an index mechanism, the holding means will restrain the output shaft at any position reached by the shaft until the next operating cycle. Thus, a non-indexing holding means has no control over the shaft position and merely holds whatever position is reached by the shaft. With either the indexing or non-indexing holding means, it is essential in practicing the present invention that the resistance of the holding means and any associated load be adequate to hold against the torque developed by the springs 48.

With the present rotary actuator construction beneficial results can be obtained with both the indexing and non-indexing holding means, however, the benefits are not necessarily the same in each case. In the following, the construction and various modes of operation of the subject rotary actuator with an indexing holding means is discussed.

For inclusion of an indexing holding means, the disc 58 is provided with a diametric bore 60, as illustrated in FIGURE 7. The bore 60 is divided in two halves by the shaft 24. Disposed in each half is a compression spring 62 which acts against the shaft 24 and which biases a ball element or detent 64 radially outwardly of the disc 58.

The outwardly biased ball elements 64 engage the inner periphery of a ring 66. The ring 66 has a plurality of peripherally spaced axially extending flutes or detent notches 68 in its inner periphery. In the preferred construction, the flutes 68 are disposed in diametrically opposite positions, as shown in FIGURE 7.

There is a dimensional interrelation between the spacing of the flutes 68, the spacing of the interfitting teeth 42 and 44, and the arcuate length of the inclined recesses 30 and 34. This interrelated dimensional relationship is determined by the number of steps to be executed by the shaft 24 in each 360° of rotation, each step ordinarily being an aliquot portion of 360°.

For the purposes of illustration, it may be assumed that the shaft 24 is to execute twelve steps in each 360° of rotation. Each step will therefore constitute an arc of 30° and, accordingly, the flutes 68 in the ring 66 are spaced at 30° intervals along the inner periphery of the ring 66 to define twelve index positions. Correspondingly, the flange 38 on the armature 26 and the surface 40 on the plate 32 are preferably provided with twelve equally spaced teeth each, establishing a 30° pitch between teeth. To produce the requisite 30° output it further follows that the inclined recesses 30 and 34 of the plates 28 and 32 should each subtend an angle of approximately 15°, with the result that a ball rolling between confronting recesses 30 and 34 will produce approximately 30° of rotation between the plates 28 and 32.

With the foregoing dimensional arrangement it is apparent that each energization of the coil 16 will result in a 30° step of the shaft 24 and at the end of each step minor inaccuracies will be taken up by the triangular flutes 68 in the ring 66, which by coaction with the balls 64, will precisely position the shaft 24 at the intended angular position. Since the springs 62 act equally and oppositely there will be no radial loading on the shaft 24 as a result of the above described indexing mechanism.

For optimum operation of the foregoing assembly, it is important that the indexing mechanism and the rotary conversion mechanism be properly aligned as the unit is assembled. The requisite alignment is achieved in the following manner. An annular shoulder is provided in the housing part 10 by means of a ring 70 having a heavy forced fit with the wall of the housing 10. The previously described split ring 52 seats against the ring 70. The ring 52 is constructed of a resilient metal that has a relaxed diameter slightly larger than the interior diameter of the housing part 10. Thus, the split ring 52 when seated against the ring 70 tends to expand against the interior wall of the housing part 10 and frictionally engages therewith. During the assembly the split ring 52 is adjusted angularly within the housing part 10 to establish the desired tension in the springs 48 and the desired bias on the plate 32, the friction between the split ring in the interior wall of the housing part 10 being utilized to temporarily preserve the desired angular setting for the split ring 52. The armature 26 is then positioned within the plate 32, causing the teeth 42 and 44 to mesh.

A spacer ring 72 is next positioned adjacent the split ring 52. The ring 66 is then positioned adjacent the ring 72, care being taken to seat the armature pins 54 in the slot 56 without applying a torque to the armature 26. The housing part 10 is then closed by the housing part 12 which has an internally located annular shoulder 74 adapted to contact the ring 66. The housing part 12 is then clamped to the housing part 10 with the following mechanism.

Each of the housing parts 10 and 12 has an annular groove 76 in the outer wall thereof adjacent the confronting ends thereof. The outboard wall 78 of each groove 76 is beveled as shown in FIGURE 2. When the housing parts 10 and 12 have been loosely assembled as previously described, an adjustable circular clamp 80 having a generally U-shaped cross section is aligned with the grooves 76 and tightened by means of a screw 82. As the clamp 80 is contracted in diameter by tightening of the screw 82, the side margins of the clamp 80 act against the beveled side walls 78 of the groove 76 to draw the housing parts 10 and 12 axially one toward the other. The axial forces thereby generated between the housing parts 10 and 12 press the ring 66 against the ring 72 and the ring 72 against the split ring 52. This effectively clamps the ring 52 against the force fitted ring 70 with the result that the alignment of parts is fixed by the friction between the various rings 66, 72, 52 and 70.

With the device assembled and the parts aligned as described the operation is as follows. Upon energization of the coil 16, the armature 26 is drawn axially toward the electromagnet core 14 thus causing the flange 38 on the armature to engage the plate 32. By reason of the previously described alignment the teeth 42 in the flange 38 are already substantially aligned with the valleys between the teeth 44 in the plate 32 and, accordingly, the teeth 44 and 42 mesh snugly with only slight rotational movement, if any.

As best appears in FIGURE 6, the sloping sides of the teeth 42, which are planar, intersect to form a radially disposed line of intersection at the apex of each tooth. Similarly, the sloping sides of adjacent teeth intersect to form a radially disposed line of intersection in the valley between each pair of adjacent teeth. Thus, the teeth diverge radially. The same is true of the teeth 44 on the plate 32 as clearly appears in FIGURE 3. As a result of this tooth construction the plate 32 and armature 26 are automatically drawn into substantially perfect concentricity as the teeth 42 and 44 mesh. As pressure is applied to the ball bearing elements 36 located between the plates 28 and 32, the ball bearing elements act in their recesses to center the plates 28 and 32. Thus, the advance of the armature 26 toward the core 14 has the initial effect of establishing concentricity between the armature 26 and the plates 28 and 32, thus precluding sliding friction between the armature 26 and the shaft 24 and also ensuring a uniform distribution of pressure among the ball bearings 36.

As the magnetic field associated with the coil 16 rises to a level sufficient to overcome the resistance of any load driven by the shaft 24 and the resistance offered by the springs 48, the axial pressure on the ball bearings 36 induces a rotation of the plate 32 relative to the plate 28 through the rotary stroke established by the arcuate recesses 30 and 34. This causes the shaft 24 to execute the desired rotary stroke and advances the ball elements 64 associated with the index mechanism from one set of flutes 68 to an adjacent set of flutes 68. The pressure of the springs 62 in the index mechanism holds the shaft 24 in its new position.

When the coil 16 is subsequently de-energized and the magnetic field associated therewith collapsed, the armature 26 is freed for motion away from the core 14. This permits the springs 48 which have been elongated by the foregoing rotary stroke to rotate the plate 32 in the direction opposite to the rotary stroke accomplished so as to reset the ball bearings 36 in the shallow ends of the recesses 34.

This resetting movement of the plate 32 causes the teeth 44 thereon to cam against the sloping walls of the teeth 42 on the flange 38 and thereby move the armature 26 axially away from the core 14. The armature 26 cannot rotate at this time for the reason that the pins 54 are engaged in the disc 58 which is secured against rotation by the action of the springs 62.

The clearance between the armature 26 and the disc 58 is sufficient to allow the armature 26 to move axially away from the core 14 a distance exceeding the axial height of the teeth 42 and 44. Thus, the teeth 44 are able to cam past the teeth 42 as the plate 32 is reset. Due to the previously described dimensional relationship between the teeth 42 and 44 and the inclined recesses 30 and 34, each tooth 44 on the plate 32 will cam past one tooth 42 in the flange 38 and then become aligned with a valley between adjacent teeth 42.

With completion of the resetting movements described the device is prepared to execute an additional rotary stroke in the same direction as the first stroke with a subsequent energization of the coil 16. In the meantime, the shaft 24 is freed for manual rotation in either a clockwise or counter-clockwise direction, the only resistance to such motion being that attributable to the springs 62 acting against the ball elements 64.

From the foregoing description it will be recognized that the teeth 42 and 44 provide a clutch mechanism between the armature 26 and the plate 32. When the coil 16 is energized the teeth are locked together due to the magnetic attraction of the armature 26 and the clutch is engaged. When the coil 16 is de-energized the armature 26 is free to move away from the electromagnet core 14 and, accordingly, the clutch is disengaged.

The teeth 42 and 44, in addition to performing the foregoing clutch function, perform another and very important function. With certain types of driven loads a jamming of the load which would prevent full execution of the rotary stroke is a possibility. Thus, there is the possibility that the index mechanism of FIGURE 7 will be stopped between adjacent flutes 68 when the coil 16 is de-energized. The same circumstance can arise when the power fails in the middle of a rotary stroke of the shaft 24, or when a temporary overload condition arises such that the electromagnet has insufficient power to execute a full operating step. In such case, the indexing ball elements 64 are left at an intermediate relatively unstable position between the flutes 68. However, when the coil 16 de-energizes the reset springs 48 remain effective to return the ball bearings 36 to their starting position in the shallow ends of the recesses 30 and 34. Upon such return, the apices of the teeth 44 in the plate 32 will not overly valleys between the teeth 42, as previously described, but rather will be aligned at intermediate positions overlying the teeth 42, it being possible in this case that the apices of the teeth 44 are aligned directly with the apices of the teeth 42.

In the next succeeding operation this condition of misalignment is automatically corrected. Thus, the next time the armature 26 is attracted toward the core 14 due to energization of the coil 16, the teeth 42 and 44 will again be brought into engagement. If the preceding faulty operating cycle moved the shaft 24 less than half the intended output stroke, the teeth 42 and 44 will engage in the next operating cycle at a position wherein the teeth 42, ordinarily being relatively immovable due to the load on the shaft 24 which includes the holding means, cam against the teeth 44 in the plate 32 causing the plate 32 to rotate against the bias of the springs 48. In such rotational action, the teeth 42 function as stationary cams and the teeth 44 function as cam followers. This rotational motion of the plate 32 continues until the teeth 42 bottom in the valleys between teeth 44, at which time the full thrust of the armature 26 is applied to the ball bearings 36 through the medium of the plate 32. At this instant the motion conversion mechanism has been returned to the position where the preceding rotary stroke was interrupted. The axial thrust of the armature 26 is then effective to complete the previously faulty rotary stroke.

Thus, when a faulty operation results in accomplishment of less than half the intended rotary stroke, the teeth 42 and 44 act as a second motion conversion mechanism which subtracts from the rotary stroke established by the first described motion conversion mechanism between the plates 28 and 32 so as to produce a partial or corrective stroke in the next succeeding operation.

For clarity, the rotary stroke produced by the arcuate recesses 30 and 34 in the plates 28 and 32 is hereinafter referred to as a primary rotary stroke and the rotary stroke produced by the teeth 42 and 44 referred to as a secondary rotary stroke. Since the rotary stroke executed by the shaft 24 may not equal either the primary or secondary stroke, the stroke executed by the shaft is hereinafter referred to as the output stroke to distinguish this stroke from the primary and secondary strokes. It will be noted that, in the structure illustrated, the maximum secondary stroke is 15°.

If, during a faulty operating cycle, more than half, but not all, of the intended output stroke is executed the teeth 42 and 44 also correct the resulting misalignment in the succeeding operating step but in a different fashion. When the faulty operation produces more than half a primary step, the torque produced by the teeth 42 and 44 when the coil 16 is next energized is in the direction of bias applied by the springs 48. However, the ball bearings 36 lock the plate 32 against rotation in this direction because they are already in the shallow ends of their recesses 30 and 34. The result of this torque, then, is an application of torque to the shaft 24 in the normal direction of rotation of the shaft 24 during a regular operating cycle. This torque application, created by the teeth 42 acting as cam followers and the teeth 44 acting as stationary cams continues until the previously faulty stroke has been completed, whereupon the teeth 42 bottom in the valleys between the teeth 44. At this time the armature 26 has just reached the position for accomplishment of a primary rotary stroke and, assuming the coil 16 has not been de-energized, a full primary stroke will then be executed.

Thus, where a faulty operation produces more than half the intended output stroke, but less than the whole stroke, the teeth 42 and 44 again provide a secondary rotary stroke which this time functions to add to the primary stroke with the result that an output stroke sufficient to complete the previously faulty operating cycle and add a full new output stroke is executed with one energization of the coil 16.

In the preceding description of a faulty operation wherein the faulty operation achieves more than half, but less than a full stroke, the operation of the device during a succeeding operating cycle has been described as if the previously faulty operating cycle was first completed with the teeth 42 and 44, then a primary stroke completed with the plates 28 and 32. As a practical matter this is not necessarily the case since the sequence in which the primary and secondary rotary conversion mechanisms operate depends upon the friction associated with each mechanism. Ordinarily, the sliding friction between the teeth 42 and 44 exceeds the rolling friction between the ball bearings 36 and the recesses 30 and 34, with the result that the primary motion conversion mechanism will operate first followed by the secondary motion conversion mechanism provided by the teeth 42 and 44. The important result is that the two rotary conversion mechanisms act additively to provide more than a normal output stroke.

There exists a theoretical possibility that a faulty operation will accomplish exactly one half of the intended output stroke, with the result that upon next energization of the coil 16 the apices of the teeth 42 and 44 engage head-on. In this improbable event a full armature thrust will be applied to the primary rotary conversion mechanism and the torque thereby produced will slide the apices of the teeth 42 and 44 off their dead-center engagement, in such direction that the secondary rotary conversion mechanism provided by the teeth 42 and 44 subtracts from the rotary stroke produced by the primary mechanism, resulting in a net one half step of operation and bringing the device in proper alignment for the next operating step.

In the preceding remarks operation of the interengaging teeth 42 and 44 has been described with reference to a misalignment of the operating parts due to a faulty operating cycle. In some cases, it is desirable to employ the teeth 42 and 44 to routinely add to or subtract from the primary rotary stroke. Thus, it may be necessary or desirable to employ inclined recesses designed to execute a 28° primary stroke in an actuator required to accomplish a 30° stroke.

This presents no difficulty with the present invention. Thus, if plates having 28° ball recesses are substituted for the plates 28 and 32 illustrated, and in making the substitution, the flutes 68 positioned so that the balls 64 seat therein when both the primary and secondary motion conversion mechanisms are under pressure, the actuator will operate with a normal 30° output stroke. This results from the fact that a release of pressure on the motion conversion mechanism after assembly allows a 28° return stroke, produced by the springs 48, which places the teeth 44 2° away from the alignment with the valleys between the teeth 42. This 2° misalignment produces a 2° secondary stroke which adds to the 28° primary stroke to produce a 30° output stroke. Similarly, a pair of plates having 32° recesses can be accommodated to a 30° index mechanism by aligning the flutes 68 while both motion conversion mechanisms are under pressure. In this case the secondary stroke will automatically add to the primary stroke to produce a net 30° output stroke.

From the foregoing discussions it can be recognized that, where an indexing holding means is employed, a wide variety of primary stroke sizes can be accommodated to a specific index mechanism by merely providing teeth in the secondary motion conversion mechanism having an angular separation between adjacent teeth which is equal to or is an aliquot part of the required output stroke. A similar result is obtained with a non-indexing holding means.

The present actuator device can be readily converted to an actuator including a non-indexing holding means by eliminating the flutes 68 at the inner periphery of the ring 66. Thus, if the ring 66 has a cylindrical inner periphery there is no index action and the balls 64 merely hold the shaft 24 in the position to which it is driven by the rotary actuator. In order to provide sufficient holding action against the torque applied by the springs 48 during the return stroke, it may be desirable to replace the detent balls 64 by suitable holding elements, not shown, so that the holding capacity will be adequate. For the purposes of the present invention the holding capacity is adequate when the holding device in cooperation with the load driven by the actuator is capable of holding against the torque exerted by the return springs 48.

With the modified holding mechanism, the accuracy of the rotary output stroke impressed on the shaft 24 by operation of the rotary actuator is determined primarily by the secondary motion conversion mechanism provided by the teeth 42 and 44. To explain this result, it can be assumed that the rotary angle between adjacent teeth 44 in the plate 32 is 30° and that the primary rotary stroke is 34°. Irrespective of the initial alignment between the teeth 42 and 44, an initial operation of the rotary actuator will cause the teeth 42 to bottom between the teeth 44 and will cause the plates 28 and 32 to rotate relatively so as to place the balls 36 in the deep ends of the recesses 30 and 34, this being the condition of the primary rotary conversion mechanism after energization of the coil 16 and full axial travel of the armature 26 in response to such energization.

When the coil 16 is then de-energized, the springs 48 will return the plate 32 through 34° of travel to bring the balls 36 to the shallow ends of the recesses 30 and 34. This 34° return stroke will carry the apices of the teeth 44 4° past the point of alignment between the teeth 42 carried by the armature.

Upon next energization of the coil 16, camming between the teeth 42 and 44 will produce 4° of rotation between the plates 28 and 32 against the bias of the springs 48, so as to subtract 4° from the primary rotary stroke. Thus, a net 30° output stroke is produced in the shaft 24. Assuming that the holding friction against the interior wall of the ring 66 is adequate to hold the shaft position at the end of each rotary stroke the actuator will always repeat the same cycle to always produce a 30° stroke.

If, on the other hand, the primary stroke is 26° while the secondary stroke remains 30°, the operation is as follows. After a first operating step, the plate 32 is returned 26° by the springs 48. This return will cause the apices of the teeth 44 in the plate 32 to return 4° short of alignment with the valleys between the teeth 42 and the armature 26. During the next operating step camming between the teeth 42 and 44 will cause the teeth to rotate the shaft 24 for 4° which is added to the primary rotary stroke of 26° to produce a net rotary output stroke of 30° in the shaft 24.

In view of the foregoing discussion it is obvious that, when a non-indexing holding device is used to restrain the shaft 24, the rotary output stroke impressed upon the shaft 24 is always determined primarily by the secondary motion conversion mechanism, it being unimportant whether the secondary stroke is larger than, smaller than or equal to the primary rotary stroke. This results holds true even if the primary rotary stroke is many times larger than the secondary rotary stroke, in which case the output stroke impressed upon the shaft 24 will be an exact integral multiple of the secondary stroke.

It can be seen that one result of the substitution of a holding device for an indexing device is to transfer the responsibility for shaft positioning from the index device to the secondary rotary mechanism. Thus, the accuracy in shaft positioning is then determined by the accuracy with which the teeth 42 and 44 are formed.

There will of course be some wear on the teeth 42 and 44, especially when the secondary stroke is not an aliquot part of the primary stroke. Such wear would of course be manifested by a rounding of the teeth at the apices thereof. However, such rounding is not detrimental to the operation of the present device, even when quite severe. Thus, the angular relationship between the armature 26 and the plate 32 is established by the side walls of the teeth 42 and 44, not by the apices, and a considerable wear at the apices of the teeth 42 and 44 can occur without disturbing this alignment. For the same reasons, it is not required that the teeth 42 and 44 are matched in the initial assembly.

From the foregoing description of the present invention it will be recognized that the invention constitutes a rotary actuator device having two axial to limited rotary motion conversion mechanisms, the primary mechanism employing the ball recesses 30 and 34 and the secondary mechanism employing the teeth 42 and 44. The two motion conversion mechanisms act together to produce a net rotary stroke which is the algebraic sum of the strokes developed in the two mechanisms. The first mechanism always develops a full primary stroke in the armature 26, always in the same direction of rotation, and therefore can be styled an axial to limited unidirectional rotary motion conversion mechanism.

The specific secondary mechanism shown my develop no rotary stroke, an additive stroke or a subtractive stroke. Hence, the second mechanism illustrated can be styled an axial to limited bidirectional rotary motion conversion mechanism.

Equal or symetric bidirectionalism is established in the secondary motion conversion mechanism by employing teeth having the shape of an isosceles triangle. For most applications symmetric bidirectionalism is not needed and, accordingly, teeth having a scalene triangular shape may be used.

An exceptional case is provided by interfitting teeth which have the shape of a right triangle so as to each have one side wall which extends axially. Such teeth have only a unidirectional motion conversion capability and therefore produce an axial to limited unidirectional motion conversion mechanism. When such mechanism is employed in the rotary actuator herein disclosed, the teeth can be used to produce a secondary stroke which subtracts from the primary stroke, however, when assembled to produce an additive stroke, a modification is necessary.

Thus, where the right angular teeth are assembled to produce a secondary stroke which can add to the primary stroke, the axially extending tooth walls interlock to prevent the return or reset stroke produced by the springs 48. To break this interlock, it is necessary to provide an axial bias for separating the plate 32 and armature flange 38 so as to free the plate 32 for the return stroke. Such axial bias is conveniently provided by placing a compression spring means, not shown, in the air gap between the armature 26 and core 14.

In the preferred embodiment of FIGURE 2 the number of teeth 42 and 44 between the armature 26 and the plate 32 coincides with the number of operating steps per revolution of the shaft 24. Thus, in a device executing twelve steps per revolution there are twelve teeth 42 and twelve teeth 44. It will occur to those skilled in the art, however, that the number of teeth 42 and 44 need not coincide with the number of operating steps. It is only important that the number of teeth distributed at equal angular intervals on either the plate 32 or flange 38 when multiplied by the number of complementary valleys also distributed at equal angles on the other of the flange 38 or plate 32 equals the number of steps to be executed by the shaft 24 or an integral multiple thereof.

As an example, FIGURE 8 schematically illustrates an arrangement of teeth and corresponding valleys wherein a combination of four teeth on one member and three valleys on the other member accommodate a device executing twelve steps per revolution. In FIGURE 8 elements corresponding to the flange 38, plate 32 and plate 28 have been developed linearly so as to facilitate an explanation of their operation.

The element 90 in FIGURE 8 corresponds to the plate 28 of FIGURE 2 and therefore has the equally spaced inclined recesses 92. The element 94 of FIGURE 8 corresponds to the plate 32 of FIGURE 3 and also has three equally spaced inclined recesses 96. Ball bearing elements 98 corresponding to the ball bearing elements 36 of FIGURE 2 are disposed between the confronting pairs of inclined recesses 92 and 96. In the position illustrated in FIGURE 8 spring means, not shown, bias the element 94 to the left as viewed in FIGURE 8 so that the ball bearings 98 are disposed in the shallow ends of the recesses 92 and 96.

The side of the element 94 facing away from the element 90 has six triangular projections or teeth cooperating to provide three equally spaced V shaped valleys 104a, 104b and 104c, which, in operating function, correspond to the valleys between the teeth 44 of the plate 32 in the preferred embodiment.

Disposed above the element 94 in FIGURE 8 is an element 100 which corresponds to the flange 38 of the preferred embodiment. Element 100 is provided with four equally spaced triangular teeth 102a, 102b, 102c and 102d. FIGURE 8 thus schematically illustrates a modification in which the armature flange has four teeth disposed at 90° intervals and the motion conversion element 94 engaged thereby has three complementing valleys disposed at 120° intervals and adapted to receive the teeth.

In the position illustrated in FIGURE 8 the tooth 102a is aligned with the valley 104a at a position designated by the reference letter A. Assuming an operating stroke has now commenced, the armature, carrying the element 100, moves the tooth 102a into the valley 104. The other teeth 102b–d contact the upper face of the element 94 so as to distribute the load on that element.

The device of FIGURE 8, being a twelve step per revolution actuator, executes a step of 30°, the length of the step being represented by the separation between the reference letters E and F. This 30° movement causes the valley 104a to move from position A to position B, the valley 104a, carrying with it the tooth 102a engaged therein. At the end of this rotary step a spring, not shown, which acts on the element 94 returns the element 94 to the left to the position shown on the drawing. However, the tooth 102a remains at position B. It is, therefore, no longer aligned with the valley 104a. However, tooth 102b, which was initially in position C as shown in FIGURE 8 has now moved to position D and is therefore aligned with the valley 104b in element 94 in position D. The device is thus ready for a second operating step wherein the clutch engagement occurs between the tooth 102b and the valley 104b.

From the preceding description of the operation of the modification of FIGURE 8, it is evident that after the second operating step the tooth 102c will be aligned with the valley 104c. Further, after the third operating step the tooth 102d will have reached the position A and will therefore be aligned with the valley 104a, the tooth 102d and valley 104a providing the clutch engagement for the fourth operating step. After twelve operating steps progressing in the fashion described, the tooth 102a will have completed a full 360° of rotation and will once again occupy the position A illustrated in FIGURE 8.

While only one tooth and one corresponding valley are engaged during any given operating step of the embodiment of FIGURE 8, it will be noted that a similar secondary rotary conversion mechanism exists in the modification of FIGURE 8 as exists in the preferred embodiment. Thus, should the tooth 102a be less than a half step off the position illustrated in FIGURE 8, the apex of the tooth 102a will still engage in the valley 104a. If the misalignment is to the left as viewed in FIGURE 8, a camming action between the left wall of the tooth 102a and the left wall of the valley 104a will produce a partial or secondary step adding to the normal step produced by the rolling action of the ball bearings 98 in their recesses 92 and 96. On the other hand, if the misalignment is to the right as viewed in FIGURE 8 the right wall of the tooth 102a will cam against the right wall of the valley 104a producing a corrective or secondary rotary stroke which subtracts from the basic rotary stroke produced by the rolling action of the ball bearings 98 and the recesses 92 and 96.

If the tooth 102a should be misaligned with respect to the recess 104a by more than one half step to the left as viewed in FIGURE 8, the rotary correction would then be effected by the tooth 102d which would then engage in the valley 104c and the correction would be a subtraction from the basic rotary stroke produced with the ball bearings 98. Similarly, if the tooth 102a should be more than one half step misaligned with the valley 104a, the misalignment being to the right, the corrective action would occur by the engagement of the tooth 102b in the recess 104b and a corrective step plus another full step executed.

Although the preferred embodiments of the device have been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. A rotary actuator for imparting rotary movement to a load including holding means to normally resist rotary movement of said load except by said actuator comprising, in combination, a primary axial to limited rotary motion conversion mechanism including first and second members relatively rotatable about a rotary axis, said members having relative movement along said axis and having axially facing surfaces, means including said axially facing surfaces to rotate one of said members relative to the other through a limited primary stroke upon application of an axial compressive thrust to said members, and yielding means fixed with respect to one of said members and engaging the other of said members to yieldingly resist said relative rotation and after said relative rotation to bias said members to an initial position of relative rotation, the bias exerted by said yielding means being ineffective to overcome the resistance of said holding means, a secondary axial to limited rotary motion conversion means including a third member normally spaced axially from said second member, and means including cooperating axially facing portions of said second and third members operable upon application of an axial compressive thrust to said second and third members to rotate one of said second and third members relative to another through a secondary rotary stroke about said rotary axis, means to attach said load to one of said first and third members, means to engage said holding means with the other of said first and third members, and motive means to apply an axial compressive thrust simultaneously to said primary and secondary conversion means and effective to overpower said holding means to produce a net relative rotation between said first and third members equal to the algebraic sum of said primary and secondary strokes, said yielding means acting upon relaxation of said axial thrust to return said one of said first and second members to said initial position relative to the other of said first and second members.

2. A rotary actuator according to claim 1 wherein said cooperating axially facing portions of said second and third members include cam means responsive to the return of said first and second members one relative to the other to disengage said second and third members for unlimited relative rotation therebetween.

3. A rotary actuator according to claim 1 wherein the cooperating portion of one of said second and third members includes a plurality of cam portions disposed circumferentially about said rotary axis, each cam portion having at least one circumferentially sloping side wall, the cooperating portion of the other of said second and third members comprising at least one cam follower portion adapted to follow the circumferentially sloping side wall of any of said cam portons and thereby produce said secondary stroke upon application of an axial compressive thrust to said second and third members.

4. A rotary actuator according to claim 3 wherein said cam portions extend contiguously and at equal circumferential intervals about said rotary axis, the interval between adjacent cam portions being an aliquot of 360°.

5. A rotary actuator according to claim 4 wherein said cam portions have the shape of an isosceles triangle.

6. A rotary actuator according to claim 1 wherein the cooperating portion of one of said second and third members includes a plurality of cam portions disposed circumferentially and at equal intervals about said rotary axis, the cooperating portion of the other of said second and third members including a plurality of cam follower portions disposed circumferentially and at equal intervals about said rotary axis and adapted to follow said cam portions.

7. A rotary actuator according to claim 6 wherein the number of cam followers differs from the number of cams.

8. In a rotary actuator, an axial to limited rotary motion conversion means comprising first and second members having axially confronting surface portions, said confronting surface portions being capable of responding to an axial movement of said members one toward the other to rotate one of said members relative to the other about a rotary axis, the confronting surface portion of said first member including at least two axially projecting tooth members each having a radial extent with respect to said rotary axis, said tooth members being circumferentially spaced about said rotary axis and each having axially convergent radially extending side walls, the confronting surface of said second member including at least two axially convergent valleys each having radially extending side walls, said valleys being spaced circumferentially at an angle equal to the circumferential spacing of said tooth portions and being adapted to interfit said tooth portions, means yieldably supporting said first and second members in a rotary alignment wherein the tooth portions of said first member confront the valleys of said second member, and motive means to apply an axial thrust moving said members one toward the other whereby said tooth portions enter said valleys and react with the side walls of said valleys to align said members concentrically with said rotary axis, said tooth portions further reacting with the side walls of said valleys to align said members rotationally about said rotary axis.

9. In a rotary actuator according to claim 8 wherein said motive means includes an axially driven member, one of said first and second members comprising an annular flange encircling and fixed to said driven member, the other of said first and second members comprising an annular body encircling said driven member in confronting relation to said flange, said driven member, upon operation of said motive means, carrying said flange axially against said body to effect said concentric and rotational alignments.

10. In a rotary actuator, the combination according to claim 9 wherein said means supporting said first and second members in rotary alignment includes a shaft and means supporting said shaft coaxial to said rotary axis, said driven member having an axial bore of a diameter exceeding the diameter of said shaft and being journalled for sliding movement on said shaft, said shaft passing through said bore, said bore, upon said driven member carrying said flange axially against said annular body, being aligned substantially parallel to said shaft by said tooth portions acting in said valleys.

11. A rotary actuator assembly comprising, in combination, a primary axial to limited rotary motion conversion means including first and second members rotatable one relative to the other about a rotary axis and spaced along said axis, said members having axially facing surfaces, means including said axially facing surfaces to rotate one of said members relative to the other through a primary stroke about said axis upon application of an axial compressive thrust thereto, yielding means fixed with respect to one of said members and engaging the other of said members to yieldingly resist said relative rotation and to bias said members to an initial position of relative rotation, a secondary axial to limited rotary motion conversion means including a third member adjacent said second member and cooperating axially facing portions of said second and third members, one of said cooperating portions comprising a plurality of tooth portions having circumferentially sloping side walls, said tooth portions being equally and circumferentially spaced about said rotary axis, the other of said cooperating portions including means to follow said sloping side walls, indexing holding means to yieldingly hold one of said first and third members against rotation relative to the other at rotary index positions separated by a stroke angle which is substantially an aliquot of 360°, said stroke angle being not less than the difference between said primary and secondary strokes and not greater than the sum of said primary and secondary strokes, the circumferential spacing between said tooth portions being substantially an aliquot of said stroke angle, motive means to apply an axial compressive thrust simultaneously to said primary and secondary motion conversion means and effective to overpower said index means to produce a net relative rotation between said first and third members equal to the algebraic sum of the relative rotations produced by said primary and secondary motion conversion means, said yielding means acting upon relaxation of said axial thrust to return said second member to said initial position relative to said first member and said index means being effective to prevent relative rotation between said first and third members during said return of said second member.

12. A rotary actuator for imparting stepwise unidirectional rotary movements to a load comprising, in combination:

a primary axial to limited rotary motion conversion mechanism including first and second members relatively rotatable about a rotary axis, said members having relative movement along said axis, means operatively connected to said members to rotate one of said members relative to the other through a limited primary stroke upon application of an axial compressive thrust to said members, and yielding means fixed with respect to one of said members and engaging the other of said members to yieldingly resist said relative rotation and after said relative rotation to return said members to an initial position of relative rotation, a secondary axial to limited rotary motion conversion means including a third member normally spaced axially from said second member and means operatively connected to said second and third members operable upon application of an axial compressive thrust to said second and third members to rotate one of said second and third members relative to the other through a limited secondary rotary stroke about said rotary axis, the rotary angle executed in said primary stroke exceeding the rotary angle executed in said secondary stroke, and motive means to apply an axial compressive thrust simultaneously to said primary and secondary conversion means to produce a net relative rotation between said first and third members equal to the algebraic sum of said primary and secondary strokes, said yielding means acting upon relaxation of said axial thrust to return said one of said first and second members to said initial position relative to the other of said first and second members.

13. A rotary actuator for imparting stepwise unidirectional rotary movements to a load comprising, in combination:

a primary axial to limited rotary motion conversion mechanism including first and second members relatively rotatable about a rotary axis, said members having relative movement along said axis, and means operatively connected to said first and second members to rotate one of said members from an initial position relative to the other through a limited primary stroke upon application of an axial compressive thrust to said members, a secondary axial to limited rotary motion conversion means including a third member adjacent said second member and means operatively connected to said second and third members to rotate one of said second and third members relative to the other through a limited secondary stroke upon application of an axial compressive thrust to said members, the rotary angle executed in said primary stroke exceeding the rotary angle executed in said secondary stroke, motive means to apply an axial compressive thrust simultaneously to said primary and secondary conversion means, and means acting upon relaxation of said axial thrust to return said one of said first and second members to said initial position relative to the other of said first and second members.

References Cited by the Examiner

UNITED STATES PATENTS

| | | | |
|---|---|---|---|
| 2,496,880 | 2/1950 | Leland | 335—228 |
| 2,881,621 | 4/1959 | Prendergast et al. | 74—126 |
| 3,096,453 | 7/1963 | Behar | 310—77 |
| 3,148,552 | 9/1964 | Vandewege | 335—228 |

FRED C. MATTERN, JR., *Primary Examiner.*

W. S. RATLIFF, *Assistant Examiner.*